Patented May 22, 1928.

1,670,598

UNITED STATES PATENT OFFICE.

SIDNEY DAVID SUTTON, OF LONDON, ENGLAND, ASSIGNOR TO VEEDIP LIMITED, OF BRENTFORD, ENGLAND, A LIMITED LIABILITY COMPANY.

MANUFACTURE OF RUBBER ARTICLES.

No Drawing. Application filed August 29, 1927, Serial No. 216,335, and in Great Britain March 30, 1927.

This invention has reference to the manufacture of rubber articles, such as rubber gloves, bulbs, and other rubber hollow articles, or rubber articles having a flat or curved surface; and it has for its objects and effects to provide articles of the kind concerned with a roughened, crinkled or uneven surface or with novel surface effects as regards pattern or design of an ornamental nature, applicable say to fancy articles, toys or the like of rubber, while in the case of the roughened, crinkled or like surface being applied to gloves, rubber fingers, or the like, this character of surface is applied mainly for useful purposes, such as constituting a gripping or non-slip surface.

According to this invention, the articles such as referred to are produced from latex, in some cases the article is produced from the latex by dipping a former, model or matrix into the liquid latex, and subsequently drying in a warm chamber, and in the method of manufacturing articles of the kind concerned, hereinafter described, the improvements under this invention are comprised; but for convenience the invention will be firstly and mainly described as applied to the manufacture say of gloves, or articles in which the characteristics herein specified are required to be produced, i. e. articles having a rough, crinkled or similar surface, so that better gripping or non-slip effect can be obtained, which is very desirable in the case of rubber gloves used by surgeons, medical practitioners and others.

In carrying out this method of manufacture, vulcanized or unvulcanized liquid latex may be used; and in operation, in making gloves or like articles, a former or model is used and dipped into the latex, which say is in the consistency of ordinary milk, which may be repeated a number of times so as to obtain the thickness of material on the former required, and upon the article so produced, another, and in some cases a final surface layer is applied, and the latex used for this is thickened or concentrated in any known manner to a suitable degree, say of the consistency of milk cream, and the roughened crinkled or like effect and surface is produced on this last and relatively thick layer or latex; and after draining this last thick layer or coating is dried by heat to the extent only that there remains beneath the dried external surface of it, a film which is not dried or solid; that is, it is in a moist or liquid form; and in this condition the article is subject to the action of a suitable rubber solvent or softening agent, with the result that the outside rubber skin formed during the surface drying action is attacked or acted upon by the solvent or softening agent, and produces a roughened, crinkled or like uneven surface desired.

A roughened or design effect or pattern can be produced on flat or curved articles by similarly subjecting the thick layer or film of latex to heat and a rubber solvent or softening medium.

Thus according to this invention, in the manufacture of such articles from liquid latex, in the process the surface effect is produced by the action of a rubber solvent or softening agent, which attacks the external dried surface or skin produced by heat, beneath which is a film or layer of wet or moist latex; and this inner film or layer remains during the period of the action of the solvent or softener. In the case of the absence of this condition, the solvent or softening agent obtains access to the foundation laminæ, and attacks them, and the article is practically rendered useless. Hence the wet, moist or partially dry latex layer or film between the external dried surface skin, and the inner or foundation or body rubber, serves as a screen or resistant to the solvent or softening agent.

After the articles have been acted upon by the solvent or softening agent, they are removed and dried by heat say in a suitably heated chamber.

The degree or amount of roughening applied to the article, will depend upon the time the articles are subject to the action of the solvent or softening agent.

In some cases, after this, the article may be dipped into this milky latex, which has the effect or improving the finished appearance of the article provided the latex is vulcanized latex. But in the case of unvulcanized latex being used, and the articles vulcanized afterwards, this final dipping may be dispensed with, and in any event is not always necessary.

With regard to the latex used, this may be vulcanized or unvulcanized, but when the articles are made from unvulcanized latex, a suitable vulcanizing agent and accelerator may be incorporated in the latex, and on the completion of the production of the roughened or patterned surface, the articles are vulcanized in hot water. Alternatively, the vulcanized process may be carried out by the well known methods of immersion in sulphur chloride solution, or exposing to the vapours of sulphur chloride.

As an example of the manner of carrying out this invention, after the article has been dipped in the thickened or concentrated latex, it is allowed to drain or drip in a cool atmosphere for several minutes; and if any surplus latex remains on the tips or lowest point of the article, this is removed in any suitable way; then the articles are taken and subjected to a hot atmosphere, say for instance about 120° F. for about a minute to two minutes, by which operation a thin external film or skin is formed, beneath which is the layer or film of wet or moist latex. The articles are then taken and immersed in or subjected to the action of a rubber solvent or softening agent, such as naphtha, petrol, benzene, the article sold as lythene under the registered trade mark or name "Lythene" carbon bisulphide or the like, for a short time, say one or two minutes, with the result that the external rubber skin outside the layer or film of wet or moist latex is attacked or acted upon by the solvent or softening agent, and this produces the roughening, crinkling or other effect as referred to; and in the case of gloves, the ridges, crinkles or upstanding spots or points may be disposed closely together; but the particular form, shape or kind of uneven surface or design may be made to differ according to the modified or different degrees of temperature and time, to which the articles are subjected.

That is to say, variations in the time of drying, and immersing or subjecting the articles to the solvent or softening agent during the process of roughening, crinkling, or producing patterns or designs, will bring about different effects, and this may be applied to any articles made according to the invention, as may be suitable or required. For instance if a very short period of drying is given, say half a minute, in a low temperature of about 70 to 90° F. before the article is subjected to the solvent or softening agent, a skin is formed on the outer layer, which when attacked or acted upon by the solvent or softening agent, is broken up or divided unevenly sometimes into patches; and in the final drying, these patches set in the wet or fluid latex beneath the skin, forming designs or patterns similar to those of crocodile and lizard skins, and other patterns or configurations.

It is to be understood that when the article to be made is not of hollow form, such as gloves, fingers, or any other article, the designs, formations, or effects referred to may be provided on the surface of a base either of flat or curved form, by applying to it a layer of the thickened or concentrated latex, and then drying the surface to form a skin, so that the layer or film of wet or unsolidified latex is retained between it and the base of the article, and then treated in the way above described. In this case of course, the article is not dipped; and generally, effects which are either ornamental or design effects, on toys or other articles, or useful effects, can be produced on any rubber or rubbered surface under this invention from latex.

Articles produced by the method hereinabove described, are not only provided with various surface irregularities, effects, or formations, but they are relatively strong and durable; and also highly flexible.

What is claimed is:—

1. The manufacture of rubber articles of the kind specified, from latex by applying liquid latex to a former or mould, drying the latex upon the former or mould, then applying thickened or concentrated latex to the surface of the dried latex, subjecting the articles to heat so that the outer skin or surface only of the thick or concentrated latex is dried and then subjecting the article to the action of a rubber solvent or softening agent whereby the said outer surface or skin formed by the drying is attacked by the solvent or softening agent, and produces a surface effect or a design, and the latex film underneath prevents by the water in it, or its state of moistness, the rubber base below from being attacked by the solvent or softening agent.

2. The manufacture of rubber articles of the kind specified, from latex by applying liquid latex to a former or mould, drying the latex upon the former or mould, then applying thickened or concentrated latex to the surface of the dried latex, subjecting the article to heat so that the outer skin or surface only of the thick or concentrated latex is dried and then subjecting the article to the action of a rubber solvent or softening agent whereby the said outer surface or skin formed by the drying is attacked by the solvent or softening agent, and produces a surface effect or design and the latex film underneath prevents by the water in it, or its state of moistness, the rubber base below from being attacked by the solvent or softening agent, drying the article in a hot chamber after being acted upon by solvent or softening agent, and then finally dipping the article in a thin vulcanized latex.

3. The manufacture of rubber articles of the kind specified from latex, by applying liquid unvulcanized latex containing vulcanizing agents and accelerators to a former or mould, drying the latex upon the former or mould, then applying thickened or concentrated latex to the surface of the dried latex, subjecting the articles to heat so that the outer skin or surface only of the thick or concentrated latex is dried and then subjecting the article to the action of a rubber solvent or softening agent whereby the said outer surface or skin formed by the drying is attacked by the solvent or softening agent, and produces a surface effect or design and the latex film underneath prevents by the water in it, or its state of moistness, the rubber base below from being attacked by the solvent or softening agent and vulcanizing the articles in hot water, or alternatively by subjecting them to immersion in sulphur chloride solution, or to the action of vapours of sulphur chloride.

4. In the manufacture of rubber articles from liquid latex, forming a film or layer of wet latex on a mould or former drying the film or layer, subsequently applying thereto a film of thickened or concentrated latex, subjecting the article to the action of the rubber solvent or softening agents, and preventing the basic film or layer from being attacked by the rubber solvent or softening agent, by drying only the outer skin or surface of the said thickened or concentrated layer or film and thereby furnishing a wet or moist film of the latter material between its surface, and the surface of the basic film or layer.

5. The formation of patterned surface on rubber articles, made from latex, by partially drying the film of thickened or concentrated latex, and then subjecting the dried external surface of film to the action of a solvent or softening agent.

6. The manufacture of rubber articles from latex by dipping a former model or mould into liquid latex, drying same, dipping the article so made into thickened or concentrated latex, then heating the article to the extent only that there remains beneath the dry external surface, a film in a moist or liquid state, then subjecting the article to a rubber solvent or softening agent whereby the rubber skin formed during the surface drying action, becomes roughened, crinkled, or uneven and then drying the articles by heat.

7. The manufacture of rubber articles of the kind specified, from latex by dipping the former into liquid latex of the consistency of ordinary milk, a plurality of times, so as to obtain the thickness of material on the former or model required, subsequently after drying dipping the article so made into thickened or concentrated latex say of the consistency of milk cream, then allowing the article to drip to remove the surplus material, then heating the article to the extent only that there remains beneath the dry external surface, a film in a moist or liquid state, then subjecting the article to a rubber solvent or softening agent, whereby the rubber skin formed during the surface drying action, becomes roughened, crinkled, or uneven, and then drying the articles by heat.

In testimony whereof I have signed my name to this specification.

SIDNEY DAVID SUTTON.